April 20, 1926.

S. J. CLULEE

EYEGLASS CONSTRUCTION

Filed July 20, 1923

1,581,100

Inventor
Stephen J. Clulee
By his Attorney
Robert S. Blair

Patented Apr. 20, 1926.

1,581,100

UNITED STATES PATENT OFFICE.

STEPHEN J. CLULEE, OF ATTLEBORO, MASSACHUSETTS, ASSIGNOR TO BAY STATE OPTICAL COMPANY, OF ATTLEBORO, MASSACHUSETTS, A CORPORATION OF MAINE.

EYEGLASS CONSTRUCTION.

Application filed July 20, 1923. Serial No. 652,708.

*To all whom it may concern:*

Be it known that I, STEPHEN J. CLULEE, a citizen of the United States, and a resident of Attleboro, county of Bristol, and State of Massachusetts, have invented an Improvement in Eyeglass Construction, of which the following is a specification.

This invention relates to eyeglass construction and with regard to its more specific features to the construction of eyeglass temple bars.

One of the objects of the invention is to provide a construction of the above nature which is efficient and dependable and capable of meeting the requirements of practical use in a highly satisfactory manner. Another object is to provide a construction of the above nature which is neat in appearance and conducive to the comfort and convenience of the wearer. Another object is to provide such a construction of a strong and durable nature, capable of long continued service and wear. Another object is to provide a construction for eyeglass temple bars which will permit of convenient and ready adjustment for accommodation to the varying conditions of practical use. Other objects will be in part obvious or in part pointed out hereinafter.

The invention accordingly consists in the features of construction, combinations of elements and arrangements of parts, all as will be illustratively herein described and the scope of the application of which will be indicated in the following claims.

Figure 1:
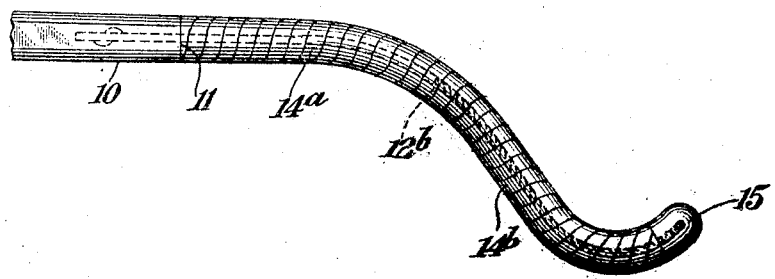
Figure 2:
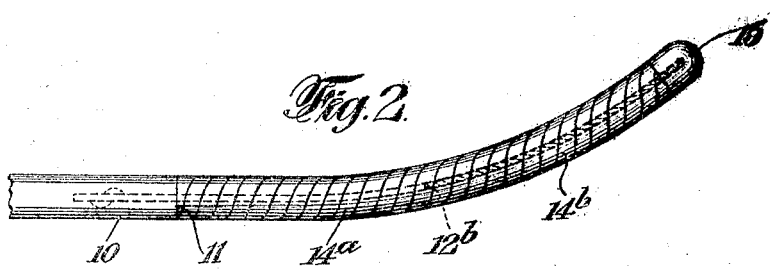
Figure 3:
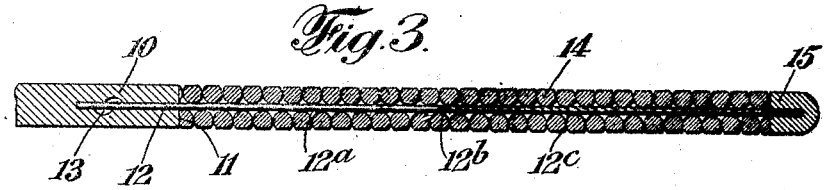

In the accompanying drawing in which is shown one of the possible embodiments of this invention, Figure 1 is a side elevation of a portion of a temple bar;

Figure 2 is a plan view of the temple bar shown in Figure 1;

And Figure 3 is a longitudinal section, the temple bar being shown in straightened form.

Similar reference characters refer to similar parts throughout the several views of the drawings.

Referring now to the drawing in detail, there is shown the rear portion of a temple bar, the forward portion being omitted since it is within the rear portion that this invention chiefly resides. A member 10 forms the main or body portion of the temple bar and as will be understood extends forwardly and is joined to the eyeglass rim or other lens mounting in the usual manner preferably by means of a hinged connection. The member 10 is of celluloid and it may be here pointed out that the term "celluloid" as used herein is to be interpreted in a broad sense throughout to comprehend various non-metallic substances of a nature similar to that of celluloid and adapted for use in eyeglass frames and associated parts. The body member 10 terminates as at 11 and projecting rearwardly therefrom is a metallic member or extension indicated generally by the reference number 12. The metallic extension 12 is connected to the body member 10 preferably by being embedded in the rear portion thereof extending thereinto to a substantial distance and substantially coaxial with the body member 10. The member 12, embedded in the member 10, is preferably provided with means interlocking with the member 10 preferably taking the form of flanges such as 13. These projections 13 thus embedded in the celluloid member 10 serve to provide a firm, dependable connection between the extension 12 and the body member 10, avoiding danger of the extension 12 turning within the member 10 or being withdrawn therefrom. In forming the connection between the member 10 and the extension 12, the member 10 may be first suitably drilled and the celluloid softened, whereupon the extension 12 having the flanges 13 thereon may be forced into place. The material of the member 10 is then pressed firmly in about the member 12 and a secure connection is obtained.

Considering now the construction of the metallic member 12, its portion 12$^a$ adjacent the member 10 and extending rearwardly therefrom to a substantial distance as to the point 12$^b$ for example is formed of a substantially smooth and solid wire member. The portion 12$^c$ extending rearwardly from the point 12$^b$ to the end is formed of a wire member having resilient properties, being preferably formed of a spirally wound wire member as indicated in Figure 3. The portion 12$^a$ is of wire which is flexible, that is, it may be bent with comparative ease but it preferably has a small degree of resilience, that is, it does not readily return to its original contour after being flexed or bent but may be shaped as desired and when so shaped will retain the conformation given it with a substantial degree of permanence. The portion 12ᶜ of the member 12 on the other hand is resilient as well as flexible, that is, when it has been bent or distorted it will spring back to its original conformation. The portion 12ᵃ therefore is adjustable, being capable of being shaped as desired and thereupon retaining such shape while the portion 12ᶜ is springy and resilient. The complete metallic extension 12 may be made in any desired manner, for example by securing together as by solder at the point 12ᵇ two separate wire members having substantially the properties outlined above.

About the metallic extension 12 extending rearwardly from the body member 10 there is preferably provided a celluloid covering which is in itself flexible, adapted to be flexed with the metallic extension 12 which thus forms a suitable core therefor. This celluloid covering preferably takes the form of a spirally wound cable of celluloid, the coils of which may be of any desired cross-section and shape. For example, the covering may take the form of a celluloid ribbon 14 coiled about the core 12 having an inner rounded surface bearing against the core 12 and an outer flattened surface adapted to provide a smooth, even exterior surface for the covering. The extreme end portion of the metallic member 12 is threaded and threaded thereon is celluloid cap 15. The ends of the celluloid strip 14 forming a flexible covering for the member 12 are respectively secured to the cap 15 and the end of the body member 10 by cementing or any other suitable means. The cap 15 thus serves as a dependable anchorage for one end of the spiral covering and furthermore forms a smooth rounded end for the temple bar. The surface of the flexible covering formed by the spiral winding is preferably substantially flush with the surface of the member 10 so that a construction having a smooth and even contour is provided.

The rear portion of the temple bar comprising the core 12 and the spiral covering 14 forms the ear portion or earpiece of the temple bar. This rear portion may be shaped to any desired contour to suit the particular need of the wearer, for example it may be shaped as shown in Figures 1 and 2, Figure 1 being a side elevation and Figure 2 being a plan view. In this particular shape of earpiece, as viewed from the side, the temple bar arches over the ear and then extends downwardly and rearwardly to the end in such manner that it may be placed over and behind the ear with the greatest ease. As viewed from the top, as shown in Figure 2, this earpiece turns inwardly in a gradual curve toward the end so that it grips the side of the head to some extent to insure dependable holding. The portion 12ᵃ of the core 12 being adjustable as has been described above, the portion 14ᵃ of the temple bar extending substantially from the point 11 to the point 12ᵇ as shown in Figures 1 and 2, is adjustable, that is it may be bent to the desired contour and will retain such contour under ordinary conditions of use. The portion 14ᵇ of the temple bar extending substantially from the point 12ᵇ to the end is springy and resilient thus affording a yielding contact with the side of the head. Since the portion 14ᵃ may be adjusted to the desired curve with great convenience, it will be seen that the construction shown and described with regard to Figure 3 is particularly well adapted for use in a temple bar of a shape similar to that shown in Figures 1 and 2. However, it is to be understood that other shapes of temple bars may employ to advantage the features described.

From the above it will be seen that there is provided in this invention a practical temple bar construction in which the several objects of the invention as well as many practical and useful advantages are attained. It will also be seen that the temple bar is particularly conducive to comfort and convenience of the wearer when in use and is capable of a greatly to be desired range of adjustment.

As various possible embodiments might be made of the above invention and as various changes might be made in the embodiment above set forth, it is to be understood that all matter herein set forth or shown in the accompanying drawing is to be interpreted as illustrative and not in a limiting sense.

I claim as my invention:

1. In construction for eyeglass temple bars, in combination, a substantially rigid main body portion adapted to be connected at its forward end to an eyeglass frame, a portion extending rearwardly therefrom over the ear and adjustable in shape, adapted to be bent for adjustment and to retain the shape to which it is bent, and a resilient rear end portion adapted when flexed to spring back to its original shape.

2. In construction for eyeglass temple bars, in combination, a substantially rigid main body portion adapted to be connected at its forward end to an eyeglass frame, a resilient rear end portion adapted to yieldingly engage the head to hold the eyeglasses in place and adapted when flexed to spring back to its original shape, and an intermediate portion joining said two portions adjustable in shape and adapted to be adjusted to determine the normal position of said flexible end portion with respect to said main body portion and with respect to the head.

3. In construction for eyeglass temple bars, in combination, a main body portion adapted to be connected at its forward end to an eyeglass frame, a flexible rear end portion adapted when flexed to return to its original shape and adapted to yieldingly engage a portion of the head behind the ear, and an intermediate portion curving over the ear and connecting said first two portions, said last portion being adjustable in curvature adapted to be bent for adjustment of the normal relative positions of said first two portions and adapted to retain the curvature to which it is bent.

4. In construction for eyeglass temple bars, in combination, a main body portion adapted to be connected at its forward end to an eyeglass frame, a flexible rear end portion curving inwardly toward the head adapted to yieldingly engage the side of the head at a part adjacent the ear and adapted upon being flexed to spring back to its original contour, and an intermediate portion connecting said first two portions and adjustable in shape, adapted to be bent to determine the normal relative positions of said first two portions and adapted to retain the shape to which it is bent.

5. In construction for eyeglass temple bars, in combination, a substantially rigid main body portion of celluloid adapted to be connected at its forward end to an eyeglass frame, and a metal member extending rearwardly therefrom and over the ear, the rear end portion of said metal member being flexible and resilient adapted when flexed to spring back to its original contour, the portion of said metal member adjacent said main body portion being adjustable in shape, adapted to be bent for adjustment and to retain the shape to which it is bent.

6. In construction for eyeglass temple bars, in combination, a substantially rigid main body portion of celluloid adapted to be connected at its forward end to an eyeglass frame, a metal member extending rearwardly therefrom and over the ear, the rear end portion of said metal member being flexible and resilient adapted when flexed to spring back to its original contour, the portion of said metal member adjacent said main body portion being adjustable in shape, adapted to be bent for adjustment and to retain the shape to which it is bent, and a flexible covering of celluloid about said metal member adapted to be flexed therewith.

7. In construction for eyeglass temple bars, in combination, a celluloid temple bar having a main forward portion adapted to be connected at its forward end to an eyeglass frame and a rear curved portion extending over the ear, said rear curved portion being flexible and tubular, and a metal core within said flexible tubular portion, said core comprising a forward portion and a rear portion joined together, the rear portion thereof being flexible and resilient adapted when flexed to spring back to its original contour, and the forward portion thereof being adjustable in shape adapted to be bent for adjustment of its curvature and to retain the curvature to which it is bent.

8. In construction for eyeglass temple bars, in combination, a celluloid temple bar having a main forward portion adapted to be connected at its forward end to an eyeglass frame and a rear curved portion extending over the ear, said rear curved portion being flexible and tubular, and a metal core within said flexible tubular portion, said core comprising a forward portion and a rear portion joined together, the rear portion thereof comprising a spirally coiled wire member which is flexible and resilient adapted when flexed to spring back to its original contour, and the forward portion thereof being a wire member adjustable in shape adapted to be bent for adjustment of its curvature and to retain the curvature to which it is bent.

9. In construction for eyeglass temple bars, in combination, a main body portion of celluloid adapted to be connected at its forward end to an eyeglass frame, and a metal member extending rearwardly therefrom and over the ear, the rear end portion of said metal member being flexible and resilient adapted when flexed to spring back to its original contour, the portion of said metal member adjacent said main body portion being adjustable in shape, adapted to be bent for adjustment and to retain the shape to which it is bent, and a flexible covering of celluloid in strip form about said metal member adapted to be flexed therewith.

In testimony whereof, I have signed my name to this specification this tenth day of July, 1923.

STEPHEN J. CLULEE.